United States Patent
Baek et al.

(10) Patent No.: US 12,095,106 B2
(45) Date of Patent: Sep. 17, 2024

(54) BATTERY MODULE AND BATTERY PACK INCLUDING THE SAME

(71) Applicant: LG Energy Solution, Ltd., Seoul (KR)

(72) Inventors: Seung Ryul Baek, Daejeon (KR); Soo Youl Kim, Daejeon (KR); Han Ki Yoon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 525 days.

(21) Appl. No.: 17/429,212

(22) PCT Filed: Jun. 22, 2020

(86) PCT No.: PCT/KR2020/008061
§ 371 (c)(1),
(2) Date: Aug. 6, 2021

(87) PCT Pub. No.: WO2021/015425
PCT Pub. Date: Jan. 28, 2021

(65) Prior Publication Data
US 2022/0131225 A1    Apr. 28, 2022

(30) Foreign Application Priority Data
Jul. 19, 2019  (KR) .................... 10-2019-0087908

(51) Int. Cl.
*H01M 50/24*    (2021.01)
*H01M 50/211*   (2021.01)

(52) U.S. Cl.
CPC ......... *H01M 50/24* (2021.01); *H01M 50/211* (2021.01); *H01M 2220/20* (2013.01)

(58) Field of Classification Search
CPC . H01M 50/24; H01M 50/211; H01M 2220/20
See application file for complete search history.

(56) References Cited

U.S. PATENT DOCUMENTS 6,225,778 B1 * 5/2001 Hayama ............... H01M 50/55
320/112
9,564,613 B2    2/2017 Tsutsumi et al.
(Continued)

FOREIGN PATENT DOCUMENTS

CN    206541888 U    10/2017
CN    207800714 U    8/2018
(Continued)

OTHER PUBLICATIONS

KR 20170019041 MT (Year: 2017).*
(Continued)

*Primary Examiner* — Alexander Usyatinsky
(74) *Attorney, Agent, or Firm* — Lerner David LLP

(57) ABSTRACT

A battery module which prevents laser transmission, and a battery pack including the same, comprises: a battery cell stack in which a plurality of battery cells are stacked, a lower frame covering a lower surface and both side surfaces of the battery cell stack, an upper frame covering an upper surface of the battery cell stack, and a rib protruding from the upper frame so as to align with a pad located between an outermost battery cell of the battery cell stack and one of the side surfaces of the lower frame. The rib is configured to cut off a laser transmitted between the upper frame and the lower frame.

12 Claims, 6 Drawing Sheets

(56) References Cited

U.S. PATENT DOCUMENTS

| | | | |
|---|---|---|---|
| 9,595,705 B1 | 3/2017 | Buckhout | |
| 9,905,818 B2 | 2/2018 | Tsutsumi et al. | |
| 2009/0072785 A1 | 3/2009 | Moon | |
| 2012/0114999 A1 | 5/2012 | Park et al. | |
| 2014/0106211 A1* | 4/2014 | Lee | H01M 50/262 |
| | | | 429/185 |
| 2018/0123097 A1* | 5/2018 | Jo | B65D 85/30 |
| 2019/0006647 A1 | 1/2019 | Ryu et al. | |
| 2019/0198952 A1 | 6/2019 | Choi et al. | |
| 2020/0127250 A1 | 4/2020 | Kim et al. | |
| 2020/0176745 A1 | 6/2020 | Lee | |

FOREIGN PATENT DOCUMENTS

| | | |
|---|---|---|
| EP | 3343691 A1 | 7/2018 |
| EP | 3675208 A1 | 7/2020 |
| JP | 2002245993 A | 8/2002 |
| JP | 2013218899 A | 10/2013 |
| JP | 2017004871 A | 1/2017 |
| KR | 20080058965 A | 6/2008 |
| KR | 20140047899 A | 4/2014 |
| KR | 20140104367 A | 8/2014 |
| KR | 20160116566 A | 10/2016 |
| KR | 20160133245 A | 11/2016 |
| KR | 20170019041 A * | 2/2017 |
| KR | 20180018109 A | 2/2018 |
| KR | 20180048101 A | 5/2018 |
| KR | 20180068158 * | 6/2018 |
| KR | 20180068158 A | 6/2018 |
| KR | 20190054709 A | 5/2019 |
| KR | 20190074758 A | 6/2019 |
| KR | 20190078521 A | 7/2019 |
| WO | 2019124869 A1 | 6/2019 |

OTHER PUBLICATIONS

KR20180068158MT (Year: 2018).*
Decision of KPO to grant a patent for Application KR 20190087908 (Year: 2022).*
Decision of JPO to grant a patent for Application JP. 2021542177 (Year: 2023).*
Extended European Search Report and European Search Opinion for European Patent No. 20843240.1 dated Mar. 23, 2022, 11 pgs.
International Search Report for Application No. PCT/KR2020/008061 mailing Sep. 28, 2020, 9 pages.

* cited by examiner

[FIG. 1]
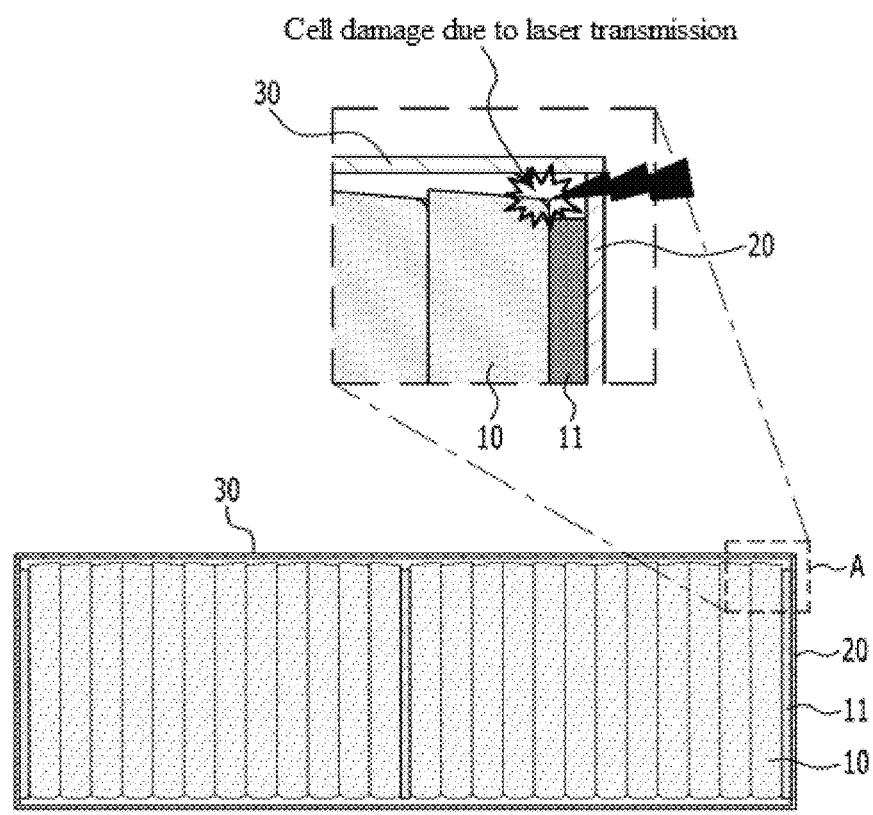

[FIG. 2]
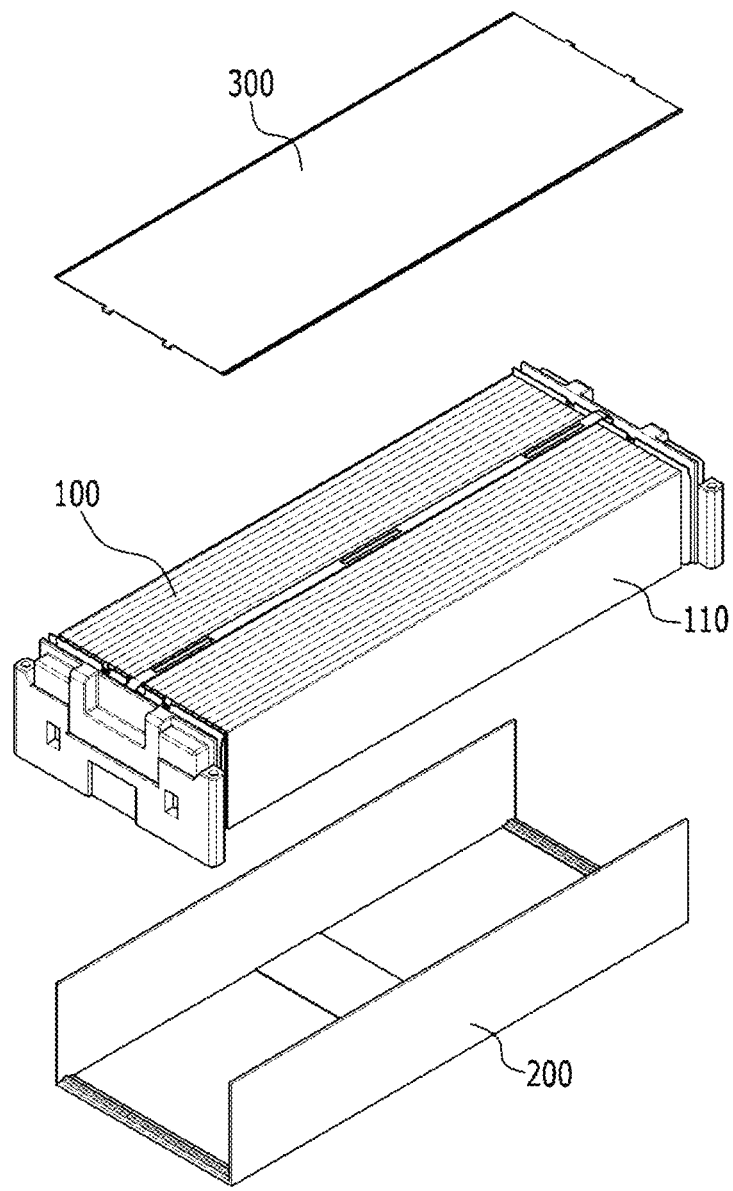

[FIG. 3]
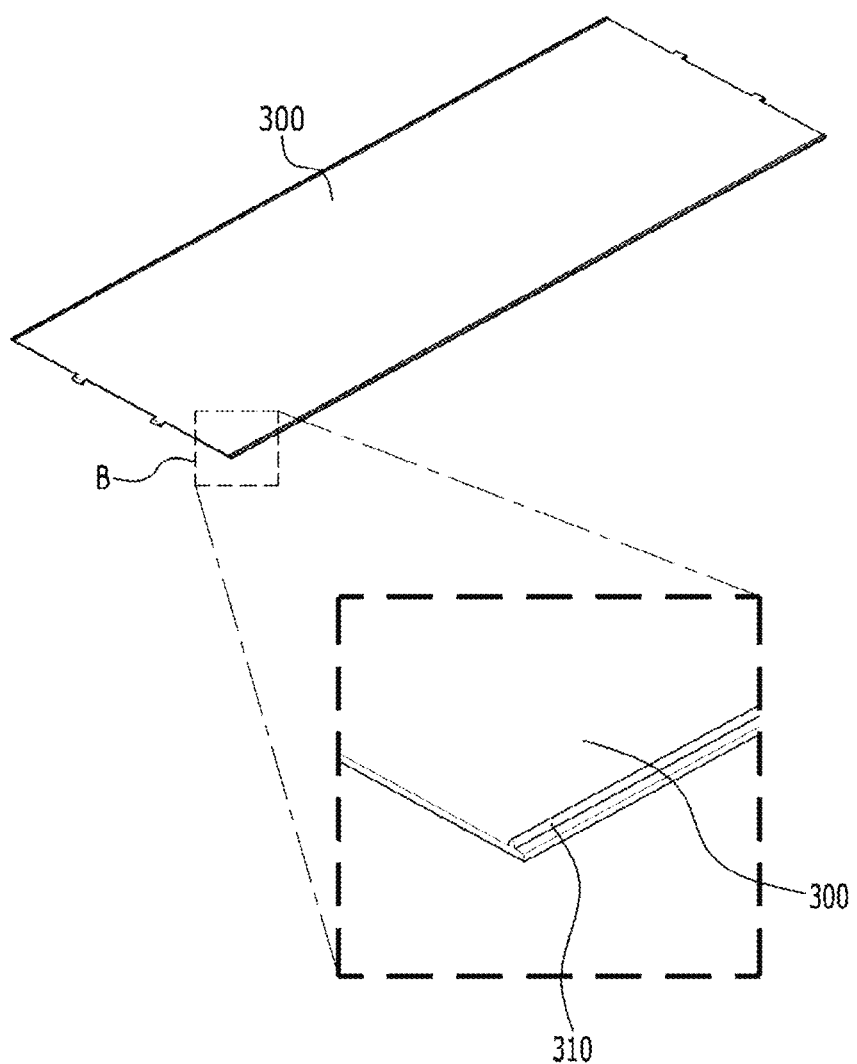

[FIG. 4]
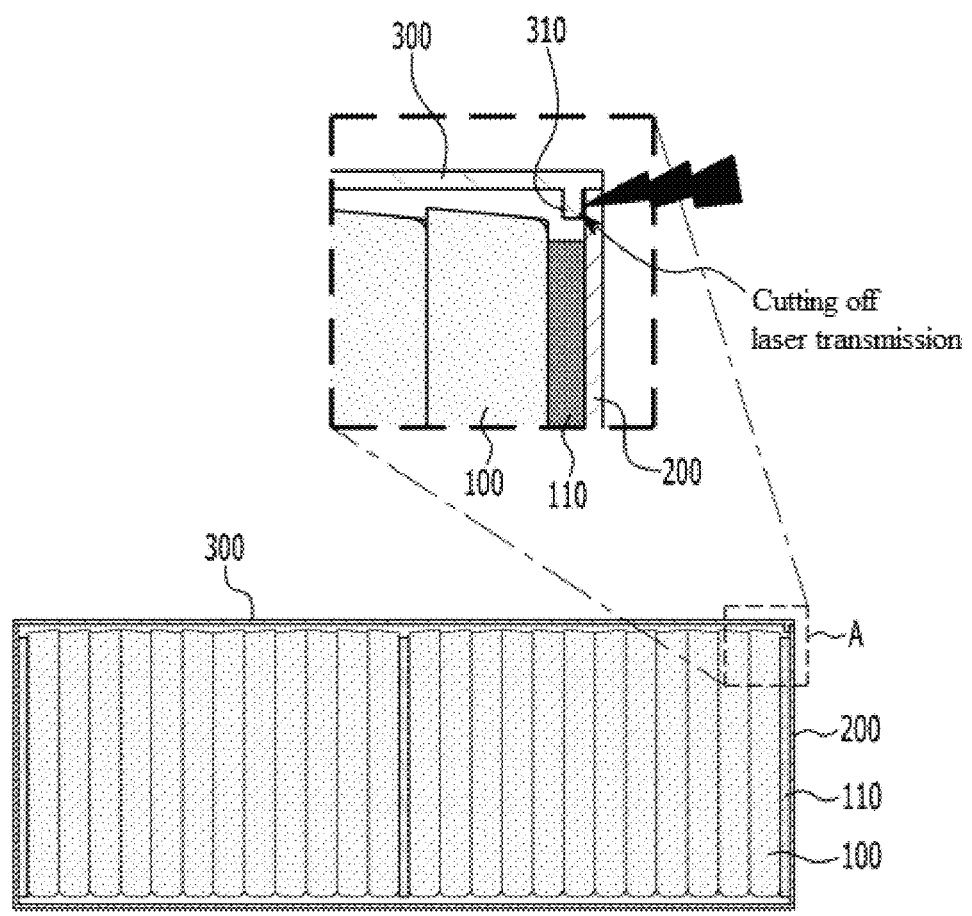

[FIG. 5]
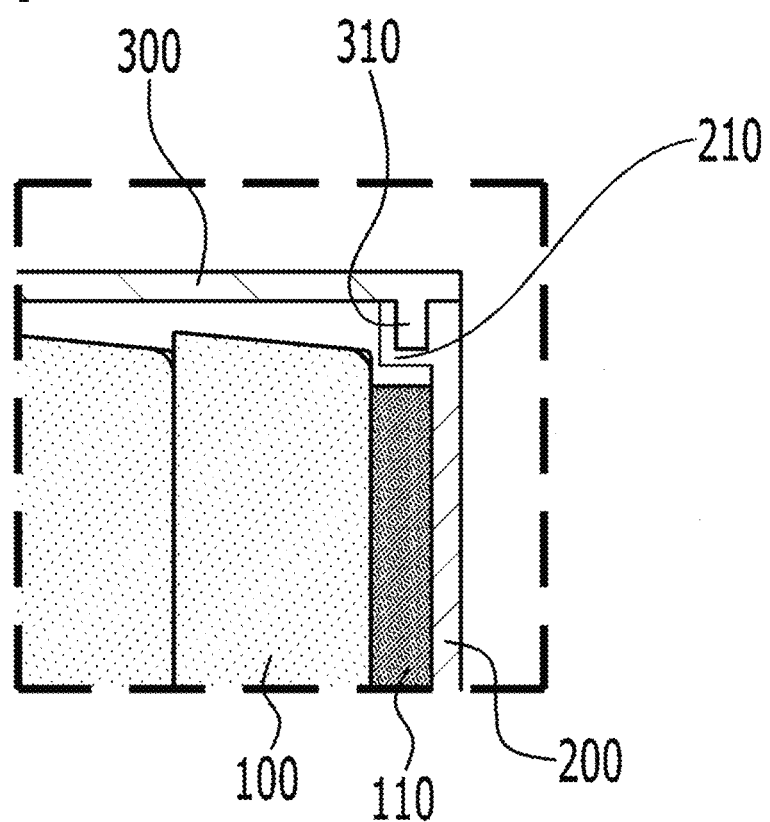

[FIG. 6]
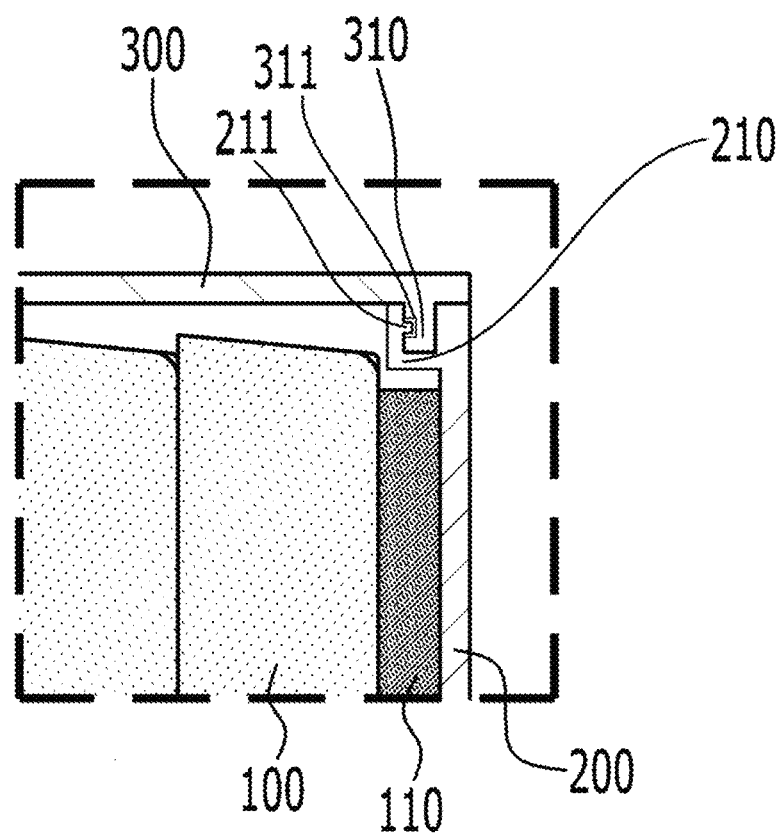

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2020/008061 filed Jun. 22, 2020, which claims priority from Korean Patent Application No. 10-2019-0087908 filed on Jul. 19, 2019, the disclosure of which is incorporated herein by reference in its entirety.

TECHNICAL FIELD

The present disclosure relates to a battery module and a battery pack including the same, and more particularly, to a battery module which prevents laser transmission, and a battery pack including the same.

BACKGROUND ART

Secondary batteries have attracted much attention as an energy source in various products such as a mobile device and an electric vehicle. The secondary battery is a potent energy resource that can replace the use of existing products using fossil fuels, and is in the spotlight as an environmentally-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, it is common to configure a battery module composed of at least one battery cell first, and then configure a battery pack by using at least one of the battery modules and adding other components.

In constructing a frame that protects the inside of any of these battery modules, a battery module formed in a U-shaped frame structure that can improve the quality of parts, increase space utilization, and reduce the amount of thermal resin used, has been studied.

The battery module of such U-frame structure is configured to include a battery cell stack in which a plurality of battery cells are stacked, a U-shaped lower frame formed on a bottom surface and both side surfaces to cover the lower surface and both side surfaces of the battery cell stack, and an upper frame covering the upper surface of the battery cell stack.

FIG. 1 is a cross-sectional view showing a structure of a contact portion of upper and lower frames in a conventional battery module.

Referring to FIG. 1, the conventional battery module includes a stack of battery cells 10, a lower frame 20 formed on a bottom surface and both side surfaces to cover a lower surface and both side surfaces of the battery cell stack, an upper frame 30 covering an upper surface of the battery cell stack, and a pad 11 formed between an outermost battery cell and the lower frame 20.

In this case, the lower frame 20 and the upper frame 30 are coupled by welding, and as shown in the enlarged view of part A of FIG. 1, a laser may be transmitted between the lower frame 30 and the upper frame 20 when welding. If the laser is transmitted into the frames 20 and 30, there is a concern that the battery cell 10 inside the frame may be damaged due to the transmitted laser.

DETAILED DESCRIPTION OF THE INVENTION

Technical Problem

The present disclosure has been made to solve the above-mentioned problems, and an object of the present disclosure is to provide a battery module including a laser beam transmission-preventing structure which prevents a laser beam from being transmitted into a frame through a welding section when welding between the frames, and a battery pack including the same.

However, the problem to be solved by embodiments of the present disclosure is not limited to the above-described problems, and can be variously expanded within the scope of the technical idea included in the present disclosure.

Technical Solution

In order to realize the above object, one embodiment of the present disclosure provides a battery module and a battery pack including the same, the battery module including: a battery cell stack in which a plurality of battery cells are stacked, a lower frame formed on a bottom surface and both side surfaces to cover a lower surface and both side surfaces of the battery cell stack, an upper frame covering an upper surface of the battery cell stack, and a rib protrudingly formed from the upper frame so as to correspond to a pad located between an outermost battery cell of the battery cell stack and both side surfaces of the lower frame, wherein the rib cuts off a laser transmitted between the upper frame and the lower frame.

Upper edges of both side surfaces of the lower frame and the lower surface of the upper frame may be coupled by welding.

The rib may be formed by extruding the upper frame.

The rib may be separately processed and attached to the upper frame.

The rib protruding from the upper frame may be formed to have a height of 1.5 mm or more.

The lower frame may further include a rib insertion part into which the rib is inserted.

The rib insertion part may be formed so as to be spaced apart from the battery cell stack.

A rib groove may be formed on a side surface of the rib, a rib groove locking part inserted into the rib groove may be formed in the rib insertion part, and the rib groove locking part may be engaged and locked to the rib groove.

The rib groove may be formed in a direction in which the battery cell stack is located, and the rib groove locking part may be engaged and locked to the rib groove.

Advantageous Effects

The battery module and the battery pack including the same according to one embodiment of the present disclosure cuts off a laser transmitted between the upper and lower frames when welding between the upper frame and the lower frame by a rib formed to protrude on a lower side of the upper frame, thereby providing the effect of preventing damage to the battery cell due to the laser in advance.

The effects of the present disclosure are not limited to the above-mentioned effects, and other effects not mentioned will be clearly understood by those skilled in the art from the description of the claims.

BRIEF DESCRIPTION OF THE DRAWINGS

FIG. 1 is a cross-sectional view showing a structure of a contact portion of upper and lower frames in a conventional battery module.

FIG. 2 is an exploded perspective view showing a battery module according to one embodiment of the present disclosure.

FIG. 3 is a perspective view showing a rib formed in an upper frame according to one embodiment of the present disclosure.

FIG. 4 is a cross-sectional view showing the position and effect of a rib according to one embodiment of the present disclosure.

FIG. 5 is an enlarged cross-sectional view showing a connection structure of upper and lower frames according to another embodiment of the present disclosure.

FIG. 6 is an enlarged cross-sectional view showing a connection structure of upper and lower frames according to still another embodiment of the present disclosure.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but rather parts of the constituent elements may be exaggerated in size.

As used herein, terms such as first, second, and the like may be used to describe various components, and the terms are used only to discriminate one component from another component.

Further, the terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Hereinafter, a battery module according to one embodiment of the present disclosure will be described with reference to FIGS. 2 to 4.

FIG. 2 is an exploded perspective view showing a battery module according to one embodiment of the present disclosure. FIG. 3 is a perspective view showing a rib formed in an upper frame according to one embodiment of the present disclosure. FIG. 4 is a cross-sectional view showing the position and effect of a rib according to one embodiment of the present disclosure.

Referring to FIG. 2 to FIG. 4, the battery module according to one embodiment of the present disclosure includes: a battery cell stack in which a plurality of battery cells 100 are stacked; a lower frame 200 formed in a U-shaped structure of a bottom surface and both side surfaces to cover a lower surface and both side surfaces of the battery cell stack; an upper frame 300 covering an upper surface of the battery cell stack; a pad 110 located between an outermost battery cell of the battery cell stack and each respective side surface of the lower frame; and a rib 310 formed from the upper frame 300 and protruding therefrom so as to correspond to the pad 110.

The battery cell 100 is a secondary battery, and may be configured into a pouch-shaped secondary battery. The battery cells 100 may be composed of a plurality of cells, and the plurality of battery cells 100 may be mutually stacked so as to be electrically connected to each other to form a battery cell stack. Each of the plurality of battery cells may include an electrode assembly, a battery case, and an electrode lead protruding from the electrode assembly.

The battery cell stack is formed to be surrounded by a lower frame 200 covering a lower surface and both side surfaces and an upper frame 300 covering an upper surface. In this case, the battery cell stack is inserted into the lower frame 200, and then, the battery cell stack may be mounted inside the frame by a method of covering an upper side of the battery cell stack by the upper frame 300.

The lower frame 200 and the upper frame 300 are coupled to each other to accommodate the battery cell stack located inside the frame. In this case, the two frames may be coupled to each other by welding. More specifically, upper edges of both side surfaces of the lower frame 200 and lower surfaces of both sides of the upper frame 300 may be coupled to each other by welding.

A busbar frame is formed on each of the front and rear surfaces of the battery cell stack. The busbar frame includes a busbar and a cell connecting board, and may be formed to cover the front and rear surfaces of the battery cell stack so that electrode leads of the plurality of battery cells 100 can be electrically connected. An end plate may be mounted on each of the busbar frames. The end plate can protect various electric devices provided in the busbar frames from external shocks, and at the same time, guide an electrical connection between the busbar frame and an external power source. An insulating member is inserted between the end plate and the busbar frame, so that an electrical connection between the busbar frame and the outside may be cut off. A flexible circuit board is provided between the busbar frames, so that the busbar frames on the front and rear surfaces of the battery cell stack can be electrically connected.

A rib 310 is formed on a lower surface of the upper frame 300. More specifically, the rib 310 may protrude downward from the lower surface of the upper frame 300 aligned with a pad 110 that is located between an outermost battery cell of the battery cell stack and a respective side surface of the lower frame 200. Therefore, ribs 310 may be formed on both sides of the lower surface of the upper frame 300.

The rib 310 may protrude so as to cover a joining part between the upper frame 300 and the lower frame 200 inside the frame. Therefore, when welding and joining the upper frame 300 and the lower frame 200, the rib 310 may cut off a laser beam, which may be transmitted between the upper frame 300 and the lower frame 200, from entering the inside.

According to one embodiment of the present disclosure, a protruding height of the rib 310 is formed to be at least 1.5 mm. When the protruding height of the rib is too low, a laser beam may be transmitted downward, and therefore, a minimum protruding height of the rib which does not transmit the laser beam may be set to cut off the laser beam transmitted through the joining part.

The rib 310 may be formed by extruding the upper frame 300. Alternatively, the rib 310 may be separately formed and then attached to the upper frame 300. The method of forming the rib is not limited thereto, and the rib may be formed through various manufacturing methods.

Hereinafter, a rib and a peripheral structure according to another embodiment of the present disclosure will be described with reference to FIG. 5.

FIG. 5 is an enlarged cross-sectional view showing a connection structure of upper and lower frames according to another embodiment of the present disclosure.

Referring to FIG. 5, the connection structure of the upper and lower frames according to another embodiment of the present disclosure is configured such that a rib insertion part 210 is formed in the lower frame 200, and so the rib 310 can be inserted into and coupled to the rib insertion part 210.

In the case of the lower frame 200, it is formed in a U-shaped structure of a bottom surface and both side surfaces, so that a plurality of battery cells 100 accommodated in the lower frame 200 can apply a force to the upper portions of both side surfaces of the lower frame 200 in an outward direction of the module by a swelling phenomenon, an elastic force of the pad, etc. As a result, the force is applied in the outward direction at the welding and joining part with the upper frame 300, so that the force acts in a direction in which the lower frame 200 is separated from the upper frame 300, and therefore, an additional support measure other than welding may be needed.

Accordingly, according to another embodiment of the present disclosure, a rib insertion part 210 is formed in the lower frame 200, and the rib 310 is inserted into the rib insertion part 210, to thereby secondarily prevent the separation of the lower frame 200 by means of the rib insertion part 210 being fixed by the rib 310 formed in the upper frame 300, in addition to the welding and joining between the lower frame 200 and the upper frame 300.

Hereinafter, a rib and a peripheral structure according to another embodiment of the present disclosure will be described with reference to FIG. 6.

FIG. 6 is an enlarged cross-sectional view showing a connection structure of upper and lower frames according to another embodiment of the present disclosure.

Referring to FIG. 6, in the connection structure of the upper and lower frames according to another embodiment of the present disclosure, a rib groove 311 is formed in the rib 310; a rib groove locking part 211 is formed in the rib insertion part 210; and the rib groove locking part 211 is engaged and locked to the rib groove 311, through which the binding between the rib 310 and the rib insertion part 210 can be further strengthened.

The battery module as described above may be included in a battery pack. The battery pack may have a structure in which one or more of the battery modules according to the present embodiment are gathered, and packed together with a battery management system (BMS) and a cooling device that control and manage battery's temperature, voltage, etc.

The battery pack can be applied to various devices. Such a device may be applied to a vehicle such as an electric bicycle, an electric vehicle, or a hybrid vehicle, but the present disclosure is not limited thereto, and is applicable to various devices that can use a battery module, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery cell
110: pad
200: lower frame
210: rib insertion part
211: rib groove locking part
300: upper frame
310: rib
311: rib groove

The invention claimed is:

1. A battery module comprising:
 a battery cell stack in which a plurality of battery cells are stacked;
 a lower frame covering a bottom surface and two side surfaces of the battery cell stack;
 an upper frame covering an upper surface of the battery cell stack and having a flat-plate shape including a lower surface facing the upper surface of the battery cell stack; and
 a rib protruding from the lower surface of the upper frame in a direction substantially perpendicular to a plane defined by the flat-plate shape of the upper frame so as to align with a pad located between an outermost battery cell of the battery cell stack and one of the side surfaces of the lower frame.

2. The battery module of claim 1, wherein an upper edge of each of the two side surfaces of the lower frame is welded to a lower surface of the upper frame.

3. The battery module of claim 1, wherein the rib is monolithically formed with the upper frame.

4. The battery module of claim 1, wherein the rib is formed separately from the upper frame and attached to the upper frame.

5. The battery module of claim 1, wherein the rib protrudes from a surface of the upper frame by a distance of 1.5 mm or more.

6. The battery module of claim 1, wherein the lower frame further comprises a rib insertion part configured to receive the rib therein.

7. The battery module of claim 6, wherein the rib insertion part is spaced apart from the battery cell stack.

8. The battery module of claim 6, wherein a rib groove is defined in a side surface of the rib, and a rib groove locking part projects from a portion of the rib insertion part, the rib groove locking part being received within the rib groove.

9. The battery module of claim 8, wherein the rib groove is oriented in a direction towards the battery cell stack.

10. A battery pack comprising the battery module according to claim 1.

11. The battery module of claim 6, wherein the rib insertion part is positioned along an upper edge of each of the two side surfaces of the lower frame.

12. The battery module of claim 6, wherein the rib insertion part is defined by a U-shaped structure having a lower portion extending between two opposing side portions, the rib being received in a receptacle defined between the lower portion and the two opposing side portions.

* * * * *